United States Patent
Kurosu et al.

(10) Patent No.: US 7,600,876 B2
(45) Date of Patent: Oct. 13, 2009

(54) OPTICAL ANGLE DETECTION APPARATUS

(75) Inventors: Tomio Kurosu, Saitama (JP); Norifumi Nakagawa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 412 days.

(21) Appl. No.: 11/366,566

(22) Filed: Mar. 3, 2006

(65) Prior Publication Data

US 2006/0197921 A1 Sep. 7, 2006

(30) Foreign Application Priority Data

Mar. 4, 2005 (JP) ............................. 2005-060644

(51) Int. Cl.
*G03B 21/14* (2006.01)
(52) U.S. Cl. .......................... 353/69; 353/70
(58) Field of Classification Search ................... 353/70, 353/69; 359/204, 196, 216; 356/3.01, 3.07, 356/3.09, 126, 623
See application file for complete search history.

(56) References Cited

U.S. PATENT DOCUMENTS

| | | | | |
|---|---|---|---|---|
| 5,584,552 | A * | 12/1996 | Nam-Su et al. | 353/70 |
| 7,131,732 | B2 * | 11/2006 | Inoue | 353/70 |
| 7,252,388 | B2 * | 8/2007 | Ogawa | 353/70 |
| 7,347,564 | B2 * | 3/2008 | Matsumoto et al. | 353/69 |
| 7,360,904 | B2 * | 4/2008 | Kuwabara et al. | 353/69 |
| 2005/0035943 | A1 * | 2/2005 | Kojima | 345/156 |
| 2005/0062939 | A1 * | 3/2005 | Tamura | 353/69 |
| 2006/0256299 | A1 * | 11/2006 | Saito | 353/70 |
| 2007/0046902 | A1 * | 3/2007 | Yajima | 353/70 |

FOREIGN PATENT DOCUMENTS

| | | |
|---|---|---|
| JP | 2003-280089 | 10/2003 |
| JP | 2003-283963 | 10/2003 |
| JP | 2004-093275 | 3/2004 |
| JP | 2004-134908 | 4/2004 |

* cited by examiner

*Primary Examiner*—William C Dowling
*Assistant Examiner*—Danell L Owens
(74) *Attorney, Agent, or Firm*—Roberts Mlotkowski Safran & Cole, P.C.; Thomas W. Cole

(57) ABSTRACT

In an optical angle detection apparatus, a single optical distance measurement unit is disposed opposite an object having a plane. The optical distance measurement unit includes a light projecting portion that projects a beam in the direction of an optical axis, and a light receiving portion that receives a beam reflected from a measurement position at which the optical axis intersects the plane and outputs a distance measurement signal indicating a distance to the measurement position. An optical axis deflector is provided for deflecting the optical axis to switch the measurement position between a first measurement position and a second measurement position, so that first and second distance measurement signals corresponding to the first and second measurement positions are output from the optical distance measurement unit. A controller obtains respective distances to the first and second measurement positions based on the first and second distance measurement signals and calculates a tilt angle of the plane based on the obtained distances.

4 Claims, 18 Drawing Sheets

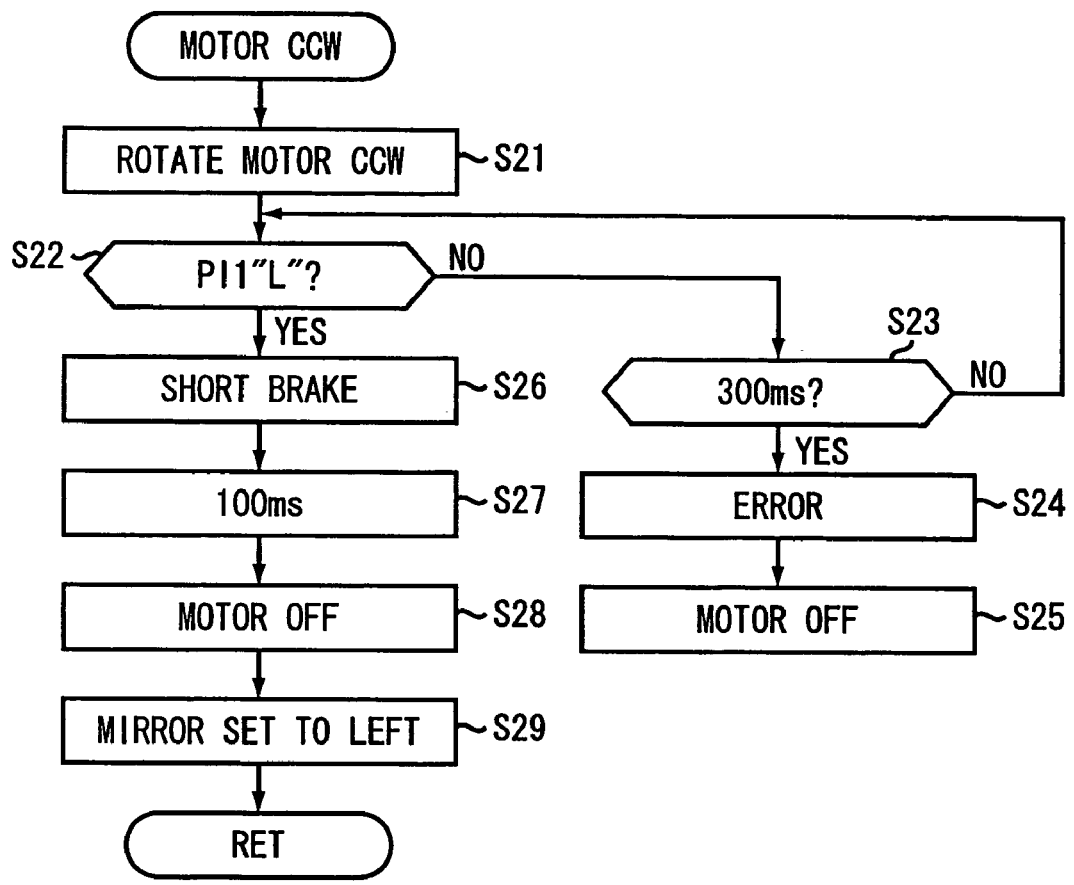
FIG. 9 (2)

OPTICAL ANGLE DETECTION APPARATUS

BACKGROUND OF THE INVENTION

1. Technical Field of the Invention

The present invention relates to an optical angle detection apparatus that optically measures a tilt angle of a plane of an object. This optical angle detection apparatus is used to detect the tilt of a screen of, for example, a liquid crystal projector and then to correct trapezoidal distortion of an image projected on the screen.

2. Description of the Related Art

When an image is magnified and projected onto a screen in a direction normal to a front surface of the screen (i.e., a screen surface) using a liquid crystal projector or the like, the projected image is displayed without distortion. On the other hand, when an image is projected not in the direction normal to the screen surface, the displayed image is distorted. Such distortion is generally referred to as trapezoidal distortion. A method for correcting the trapezoidal distortion through image signal processing is known. This method negates trapezoidal distortion by performing digital processing on an image signal to give reversed distortion to the image. A method for detecting the tilt angle of a screen and automatically correcting trapezoidal distortion based on the detected tilt angle has been suggested, and examples thereof are described in Patent References 1 to 4.

[Patent Reference 1] Japanese Patent Application Publication No. 2003-280089

[Patent Reference 2] Japanese Patent Application Publication No. 2003-283963

[Patent Reference 3] Japanese Patent Application Publication No. 2004-093275

[Patent Reference 4] Japanese Patent Application Publication No. 2004-134908

An angle detection apparatus disclosed in Cited Reference 3 detects the tilt angle of a screen for a projector using a line type passive distance measurement unit. This apparatus increases measurement accuracy by performing calculation for measuring distances in a plurality of directions using the line type passive distance measurement unit. For example, the angle detection apparatus calculates four tilt angles (from horizontal) of the screen relative to the projector based on distances measured in five directions by the line type passive distance measurement unit and then obtains the average of the four tilt angles.

An angle detection apparatus disclosed in Patent Reference 4 will now be briefly described with reference to FIGS. 16-19. This conventional angle detection apparatus uses an ultrasonic sensor 100 and FIG. 16 shows reflection characteristics of the apparatus. In FIG. 16, "(1)" indicates a state where the ultrasonic sensor 100 is oriented in a direction perpendicular (normal) to a screen 20. In this state, an ultrasonic wave transmitted by the ultrasonic sensor 100 is reflected at a right angle by the screen 20 and then returns to the ultrasonic sensor 100. In FIG. 16, "(2)" indicates a state where the ultrasonic sensor 100 is oriented at a small angle with respect to the direction normal to the screen. In this state, since an ultrasonic wave transmitted by the ultrasonic sensor 100 is incident at a small oblique angle on the screen 20, the intensity of the ultrasonic wave, which has returned to the ultrasonic sensor 100, is reduced. Similarly to the state (2), in a state (3) of FIG. 16, the intensity of an ultrasonic wave, which has returned to the ultrasonic sensor 100, is further reduced since the ultrasonic wave is incident at a larger oblique angle on the screen 20 than the state (2).

FIG. 17 shows the relationship between the states. In FIG. 17, a horizontal axis represents a rotation angle of the ultrasonic sensor 100 and a vertical axis represents the level of a reflected ultrasonic wave. When the rotation angle of the ultrasonic sensor 100 oriented in the direction perpendicular to the screen 20 is set to 0°, the reflected ultrasonic wave level is in the shape of a parabolic curve centered at a rotation angle of 0° as shown in FIG. 17. As can be seen from this figure, the reflected ultrasonic wave level is maximized when the ultrasonic sensor 100 is oriented perpendicular to the screen 20.

This characteristic is utilized to detect the angle of the screen 20 relative to the projector 10. FIG. 18 shows the concept of such angle detection. As shown, if the screen 20 is tilted at an angle $\theta$ relative to the projector 10, the ultrasonic sensor 100 is oriented perpendicular to the screen 20 when the ultrasonic sensor 100 rotates at the angle $\theta$ relative to the projector 10.

FIG. 19 shows the relationship between the rotation angle of the ultrasonic sensor 100 and the reflected ultrasonic wave level in the case of FIG. 18. As shown in FIG. 19, the reflected ultrasonic wave level is maximized when the rotation angle of the ultrasonic sensor 100 is $\theta$. Thus, the angle of the screen 20 relative to the projector 10 can be detected by determining the rotation angle of the ultrasonic sensor 100 at which the reflected ultrasonic wave level is maximized.

However, the method using the line type passive distance measurement unit disclosed in Patent Reference 3 has a problem in that the circuit configuration or the calculation is complicated, thereby increasing the costs. In addition, when the passive type distance measurement unit is used, distance measurement cannot be performed if an object for measurement is bright and has no contrast. Moreover, when the tilt angle of a screen is measured, the angle cannot be measured until a light source lamp of the projector is lit. Thus, the method has a problem with ease of use.

In the method described in Patent Reference 4, to detect the peak of the reflected wave, the calculation and control unit must be always active while the ultrasonic sensor rotates. In the method of Patent Reference 4, all reflected wave levels detected while the sensor rotates are obtained and the maximum level thereof is calculated. Thus, the method of Patent Reference 4 requires very complicated, highly accurate operations.

SUMMARY OF THE INVENTION

The present invention has been made in view of the above problems, and it is an object of the present invention to provide an optical angle detection apparatus that can perform active angle detection with simple operations.

In accordance with the present invention, the above and other objects can be accomplished by the provision of an optical angle detection apparatus comprising a single optical distance measurement unit disposed opposite an object having a plane; an optical axis deflector that can deflect an optical axis, which is oriented from the optical distance measurement unit to the plane of the object, toward a first orientation and toward a second orientation; and a controller that controls the optical distance measurement unit and the optical axis deflector to measure a tilt angle of the plane of the object, wherein the optical distance measurement unit includes a light projecting portion that projects a beam in the direction of the optical axis; and a light receiving portion that receives a beam reflected from a measurement position at which the optical axis intersects the plane and outputs a distance measurement signal indicating a distance to the measurement position, wherein the optical axis deflector deflects the optical axis between the first orientation and the second orientation, thereby switching the measurement position between a first measurement position and a second measurement position, so that a first distance measurement signal corresponding to the first measurement position and a second distance measurement signal corresponding to the second measurement position are output from the optical distance measurement unit, wherein the controller obtains respective distances to the first and second measurement positions based on the first and second distance measurement signals and calculates the tilt angle of the plane based on the obtained distances.

Preferably, the optical axis deflector includes a rotatably mounted mirror, the mirror being disposed on the path of a beam projected by a fixed light projecting portion and the path of a beam to be received by the fixed light receiving portion, such that the optical axis is deflected to the first orientation and to the second orientation by rotating the mirror under control of the controller. In addition, the light receiving portion includes a light receiving surface that is disposed along the direction of a base line perpendicular to the optical axis in order to receive a spot of the beam reflected from the object, and outputs the distance measurement signal corresponding to a position of the received spot on the light receiving surface. Further, the optical distance measurement unit is mounted in a projector, and the controller measures a tilt angle of a plane of a screen onto which the projector projects an image, the screen corresponding to the object.

The optical angle detection apparatus according to the present invention uses an active optical distance measurement unit including a light projecting portion and a light receiving portion. This optical distance measurement unit receives a beam reflected from a measurement position and outputs a distance measurement signal indicating the distance to the measurement position. The present invention includes an optical axis deflector for switching the optical axis of the optical distance measurement unit, so that the measurement position is switched between two positions. The tilt angle of a plane of an object is calculated based on distance measurement signals obtained at the two measurement positions. Since the present invention uses the active distance measurement unit including the light projecting portion in such a manner, it is possible to measure the tilt angle of the screen at any time when needed, for example, when the active distance measurement unit is embedded in the projector. When the passive distance measurement unit is used, there is a time limitation since the tilt angle cannot be measured until the light source lamp is lit to illuminate the screen. According to the present invention, there is no need to continuously rotate the distance measurement unit and it is possible to measure the tilt angle simply by switching the optical axis between two positions. Also, there is no need to monitor the reflected wave level while angularly moving the distance measurement unit as in the related art. Thus, the present invention simplifies the configuration and operation. In spite of the simplicity, the method for performing distance measurement simply by switching the optical axis orientation can detect the angle with high accuracy, compared to when the reflected wave peak is calculated by angularly moving the distance measurement unit.

DETAILED DESCRIPTION OF THE INVENTION

Figure 1:
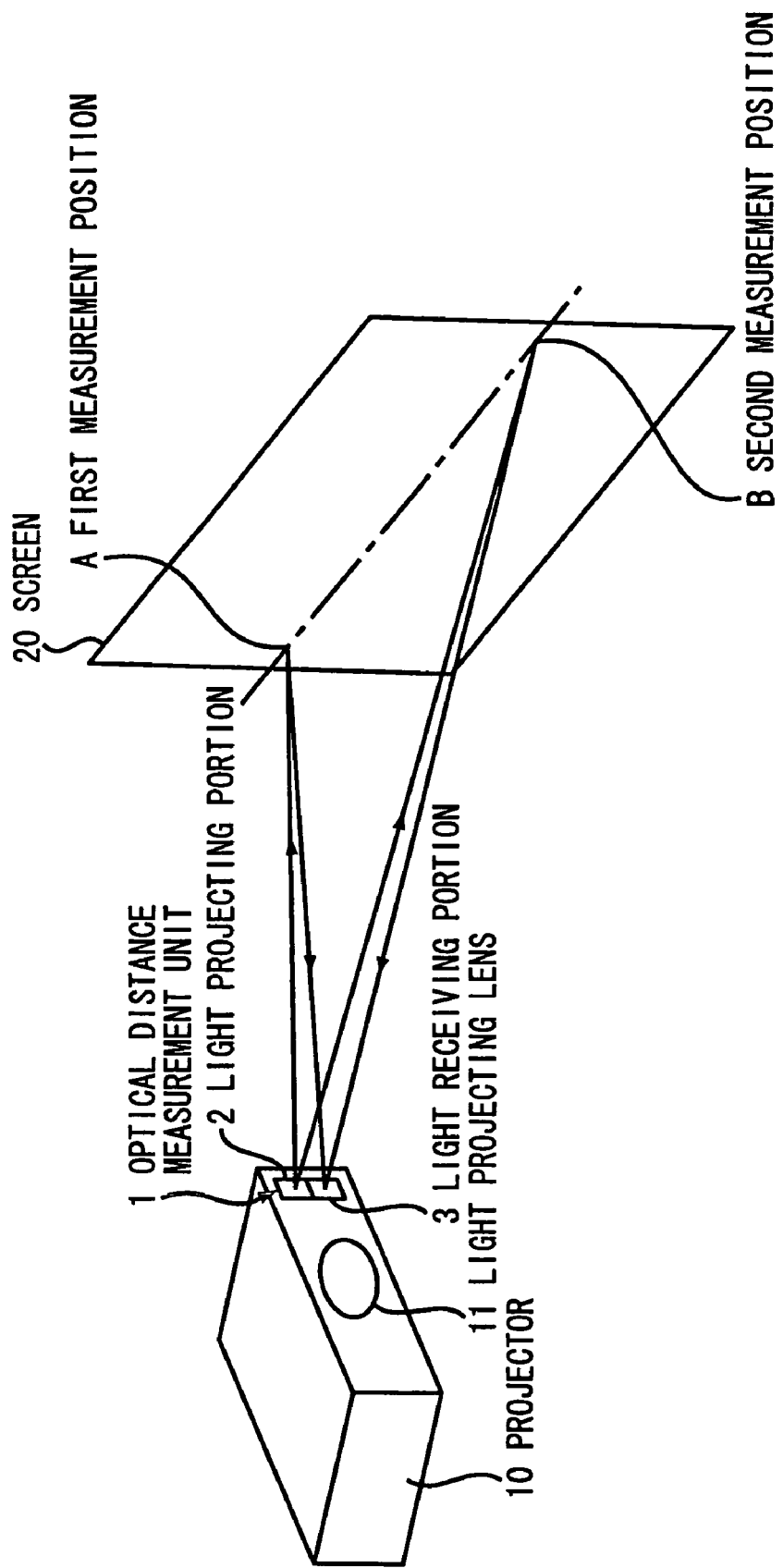
FIG. 1 is a perspective view showing an overall configuration of an optical angle detection apparatus according to the present invention.

Embodiments of the present invention will now be described in detail with reference to the drawings. FIG. 1 is a perspective view showing a basic configuration of an optical angle detection apparatus according to the present invention. The optical angle detection apparatus according to the present invention basically includes an optical distance measurement unit 1, an optical axis deflector, and a controller. The optical angle detection apparatus constructed in this manner is embedded, for example, in a projector 10. In the shown example, only the optical distance measurement unit 1 appears at a front portion of the projector 10 and the other components, the optical axis deflector and the controller, are housed in a case of the projector 10.

Only one optical distance measurement unit 1 is used and it is disposed opposite an object having a plane. In the shown example, the object is a screen 20. The screen 20 is disposed opposite the projector 10 and an image projected from a light projecting lens 11 is displayed on the screen 20. The optical axis deflector switches the optical axis, which is oriented from the optical distance measurement unit 1 to the screen 20, between a first orientation and a second orientation so that the optical axis can be deflected toward the first orientation and toward the second orientation. The controller controls the optical distance measurement unit 1 and the optical axis deflector to measure a tilt angle of the screen 20. The tilt angle of the screen 20 measured in this manner is used, for example, to correct trapezoidal distortion of an image signal input to the projector.

The optical distance measurement unit 1 includes a light projecting portion 2 and a light receiving portion 3. The light projecting portion 2 projects a beam in the direction of the optical axis. The light receiving portion 3 receives a beam reflected from a measurement position on the screen 20 where the optical axis intersects the screen 20 and outputs a distance measurement signal indicating the distance to the measurement position. The above-mentioned optical axis deflector deflects the optical axis between the first and second orientations, thereby switching the measurement position between a first measurement position A and a second measurement position B, so that a first distance measurement signal corresponding to the first measurement position A and a second distance measurement signal corresponding to the second measurement position B are output from the optical distance measurement unit 1. The above-mentioned controller obtains respective distances to the first and second measurement positions A and B based on the first and second distance measurement signals, and calculates a tilt angle of the screen 20 based on the difference between the obtained distances.

When a triangle OAB with the optical distance measurement unit 1 assumed as an origin O is considered, the lengths of sides OA and OB are obtained through the above-mentioned distance measurement operation. A vertex angle AOB is the deflection angle between the first and second optical axis orientations, which is known to the controller. The triangle AOB is determined based on data of the sides AO and BO and the vertex angle AOB. The angle between the sides AB and AO is obtained by simple geometric calculation. The orientation of the side AB, which intersects the first optical axis orientation AO with an angle OAB, can be calculated since the first optical axis orientation AO is known to the controller. The orientation of the side AB corresponds to the tilt angle of the screen 20. In the shown example, the side AB is a horizontal line, and the tilt angle of the horizontal direction of the screen 20 is detected.

Figure 2:
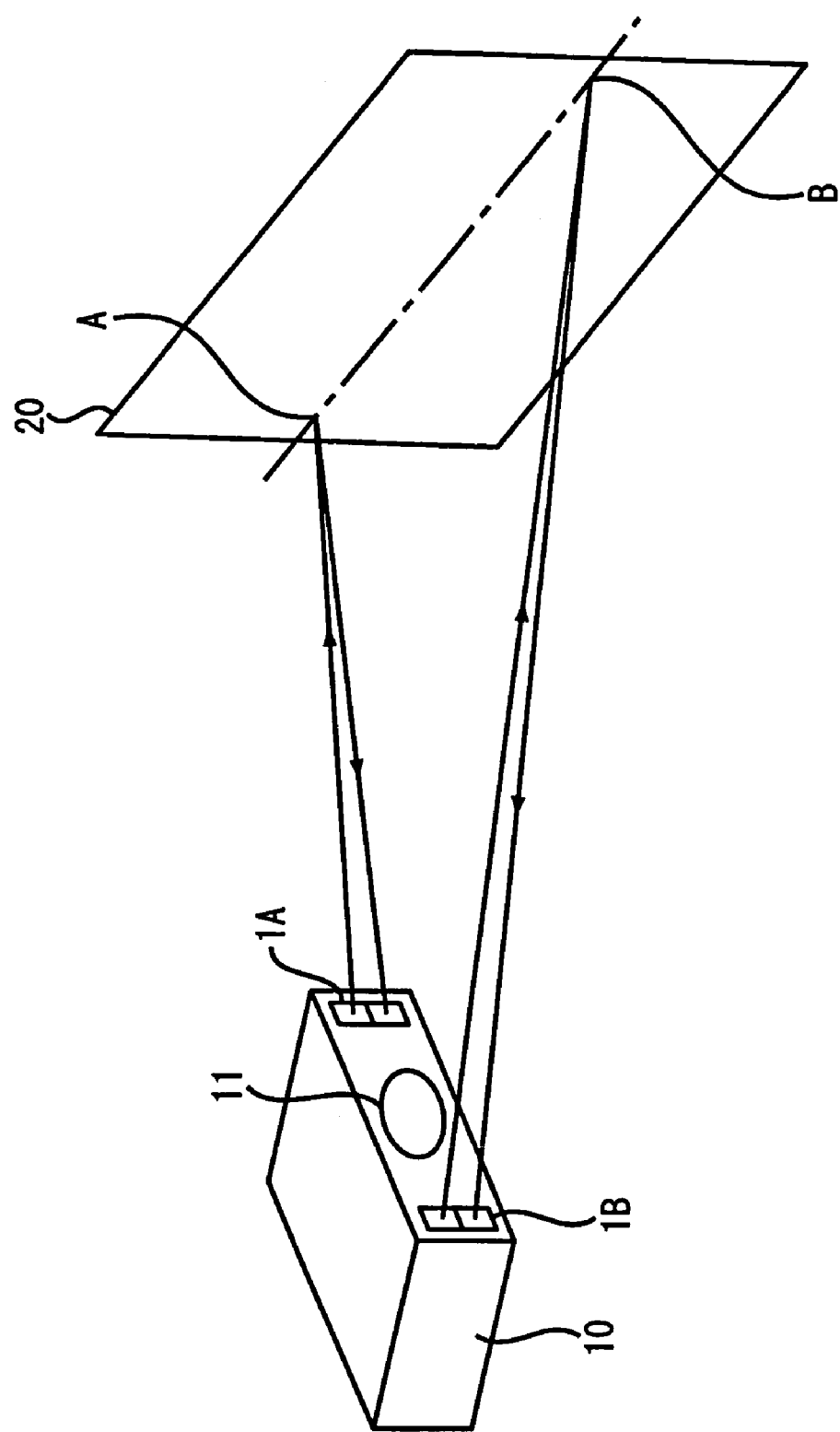
FIG. 2 is a perspective view showing an optical angle detection apparatus according to a reference example.

FIG. 2 is a schematic diagram showing an optical angle detection apparatus according to a reference example. For better understanding, elements corresponding to those of the present invention shown in FIG. 1 are denoted by the corresponding reference numerals. The difference is that a pair of optical distance measurement units 1A and 1B are provided on the front frame of the projector 10(A)t both sides of the front frame. One optical distance measurement unit 1A obtains the distance to the measurement position A and the other optical distance measurement unit 1B obtains the distance to the measurement position B. In this reference example, both the first and second optical axis orientations are fixed and there is no need to switch between the first and second orientations. However, when the pair of optical distance measurement units 1A and 1B is used, it is difficult to perform reliable angle detection if the characteristics of the two units 1A and 1B are not identical. Generally, optical distance measurement units are temperature dependent and their measurement results vary depending on the ambient temperature. For example, when the temperature characteristics of one optical distance measurement unit 1A have a positive gradient and the temperature characteristics of the other optical distance measurement unit 1B have a negative gradient, the distance measurement error is increased, thereby failing to perform reliable angle detection. In this case, correction calculation is performed taking into consideration the temperature characteristics of the pair of optical distance measurement units 1A and 1B. However, this correction calculation does not necessarily achieve practical measurement accuracy. On the other hand, the configuration of the present invention shown in FIG. 1 is almost completely unaffected by changes in the characteristics depending on the ambient temperature since the distance measurement is performed by switching the optical axis orientations of the single optical distance measurement unit 1. The influence of the temperature characteristics has the same effect for the plurality of measurement points, so that the influence for the two measurement points is canceled in the course of calculation, thereby achieving highly accurate angle detection.

Figure 3:
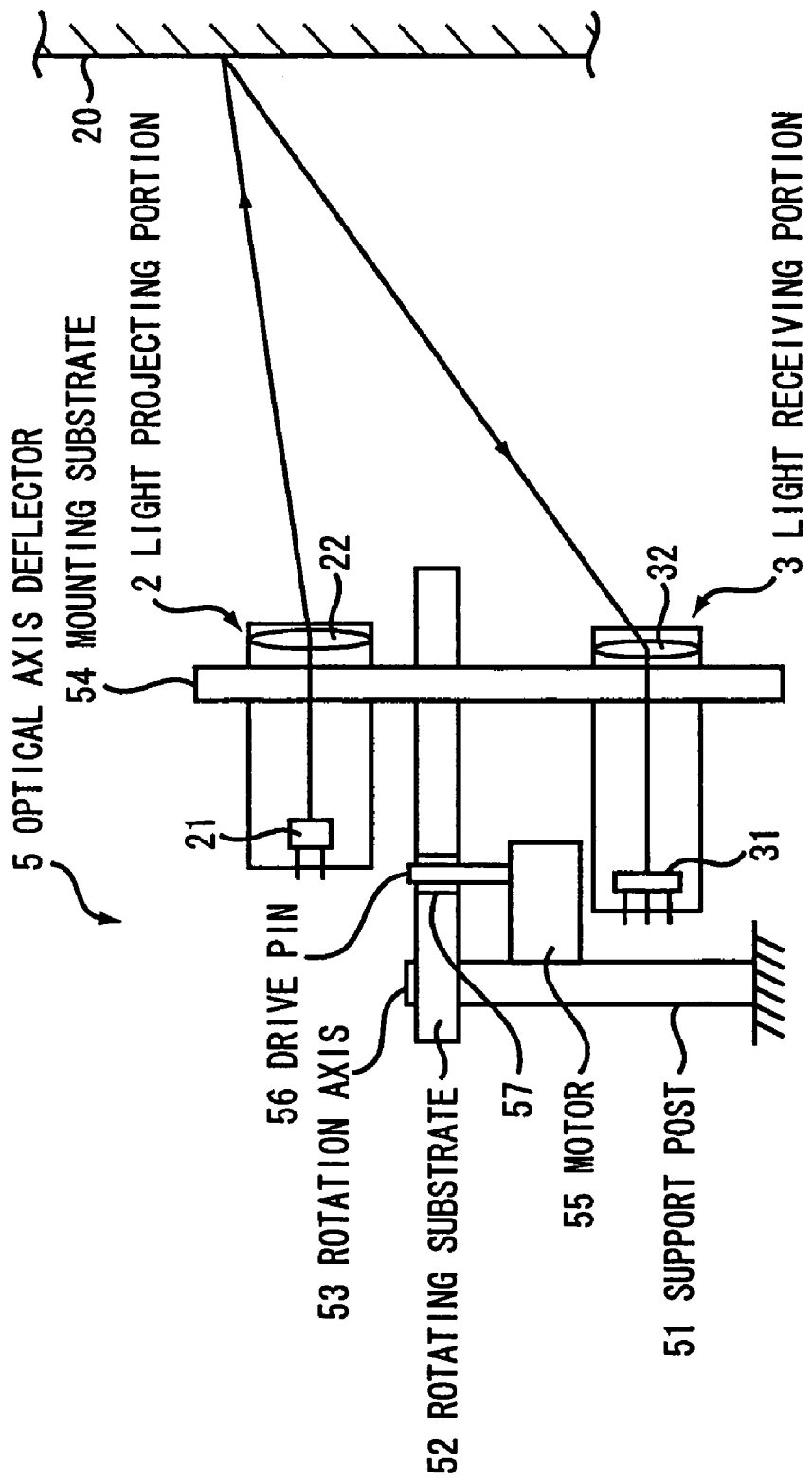
FIG. 3 is a side view showing an embodiment of the optical angle detection apparatus according to the present invention.

FIG. 3 is a schematic side view showing an embodiment of the optical angle detection apparatus according to the present invention. As described above, the optical angle detection apparatus 1 includes a single optical distance measurement unit, an optical axis deflector 5, and a controller. The optical distance measurement unit includes a light projecting portion 2 and a light receiving portion 3, which are spaced vertically and mounted on a mounting substrate 54. The light projecting portion 2 includes a light emitting element 21, which emits a beam, and a light projecting lens 22 which directs the beam to the screen 20. The light receiving portion 3 includes a focusing lens 32, which focuses the beam reflected from the screen 20, and a light receiving element 31 which receives the focused beam and outputs a corresponding distance measurement signal.

The mounting substrate 54, on which the light projecting portion 2 and the light receiving portion 3 are mounted, is fixed to a rotating substrate 52. The rotating substrate 52 is rotatable horizontally about a support post 51 as a rotation axis 53. A motor 55 is mounted on the support post 51, and a drive pin 56 thereof is inserted in an opening 57 formed in the rotating substrate 52. The mounting substrate 54, the rotating substrate 52, and the motor 55, which are described above, constitute the optical axis deflector 5.

Figure 4:
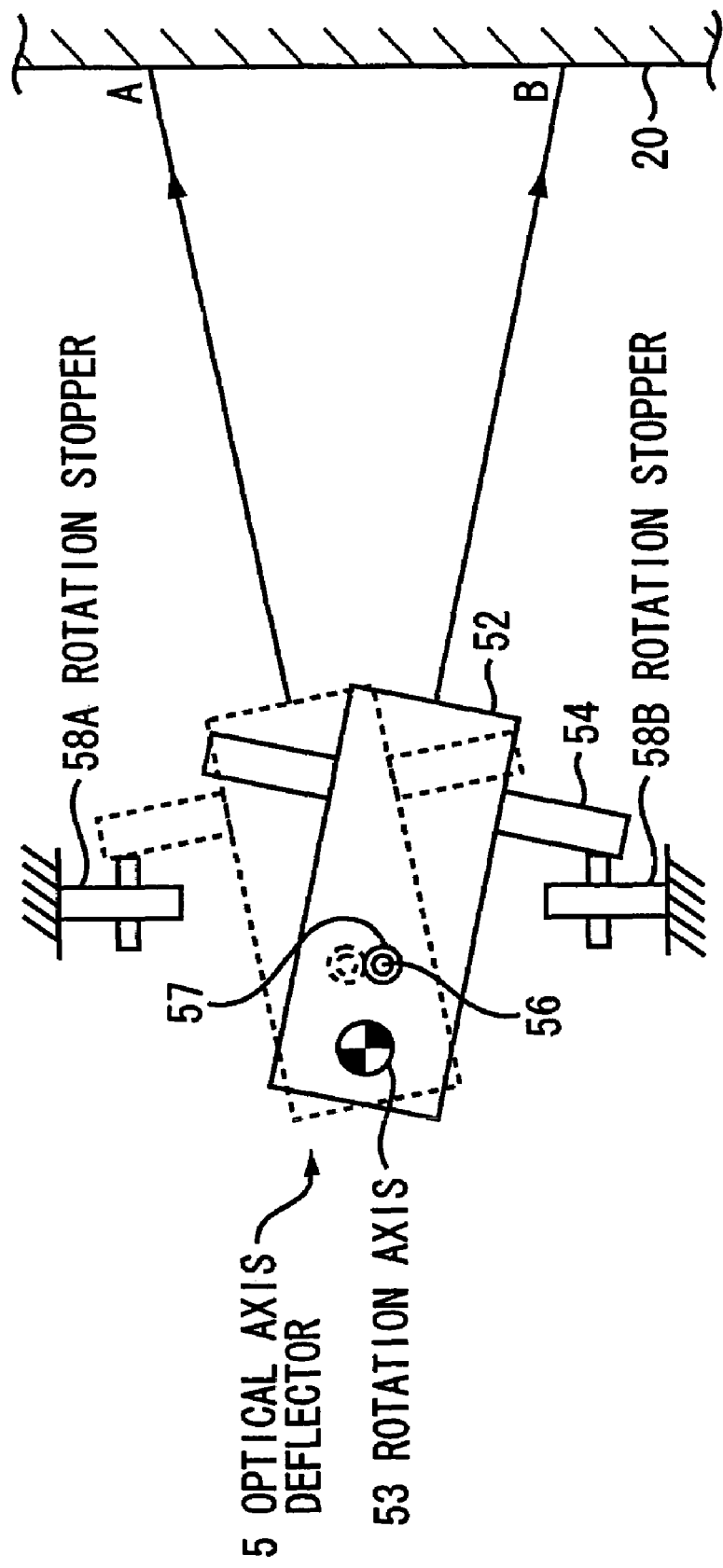
FIG. 4 is a plan view showing an embodiment of the optical angle detection apparatus according to the present invention.

FIG. 4 is a plan view illustrating how the optical axis deflector 5 shown in FIG. 3 operates. As shown, the rotating substrate 52 is rotatable to the left and to the right about the rotation axis 53. Accordingly, the optical axis orientation of the optical distance measurement unit, mounted on the mounting substrate 54, switches between the first and second orientations, so that the measurement position moves between points A and B. When the drive pin 56 rotates clockwise as voltage is applied to the motor 55, the rotating substrate 52 rotates clockwise in conjunction with the drive pin 56 and then contacts a rotation stopper 58B so that the second optical axis orientation is accurately positioned. When the voltage applied to the motor 55 is reversed, the drive pin 56 rotates counterclockwise and the rotating substrate 52 then rotates counterclockwise via the opening 52. The rotation of the rotating substrate 52 is stopped at a position where it contacts a rotation stopper 58A, so that the first optical axis orientation toward the measurement position A is accurately positioned and fixed.

Figure 5:
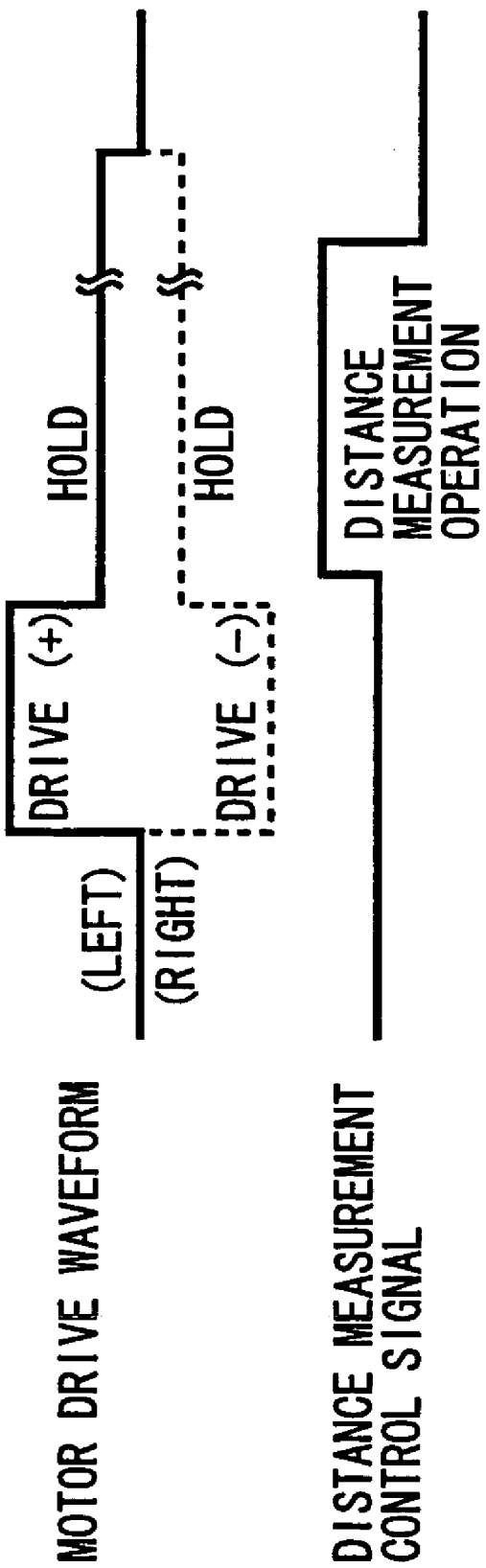
FIG. 5 is a timing chart illustrating how the embodiment shown in FIGS. 3 and 4 operates.

FIG. 5 is a timing chart illustrating how the optical axis deflector 5 shown in FIG. 4 operates. A motor drive waveform is shown at the upper side of FIG. 5 and a distance measurement control signal is shown at the lower side thereof. When the optical axis orientation is set to the left, a positive drive waveform is applied to the motor and the level of the drive waveform is lowered at the moment when the rotating substrate 52 contacts the corresponding rotation stopper 58A. This holds and fixes the left optical axis orientation. In some cases, a holding voltage to be applied to the motor can be omitted by using a holding and fixing spring. On the other hand, when the optical axis orientation is switched to the right, a negative drive waveform is applied to the motor. The level of the drive waveform is lowered at the moment when the rotating substrate 52 contacts the corresponding rotation stopper 58B. The optical axis orientation of the optical distance measurement unit can be switched to the left and to the right by switching the polarity of the drive waveform applied to the motor in this manner. With the optical axis orientation held and fixed to the left or right, a distance measurement signal is provided to the optical distance measurement unit to perform a distance measurement operation. This makes it possible to accurately determine distances from the projector to the measurement positions A and B on the screen 20.

Figure 6:
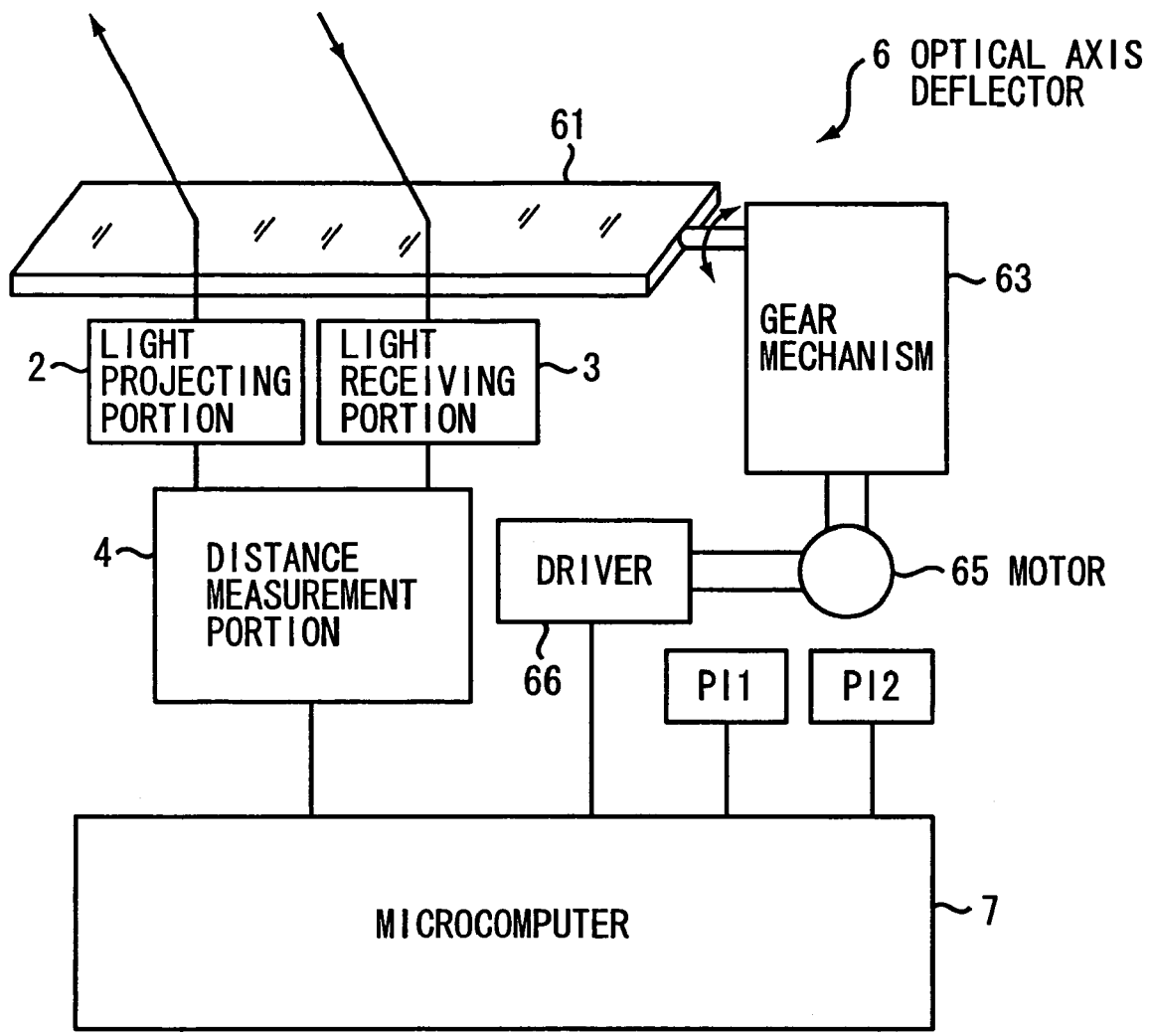
FIG. 6 is a block diagram showing another embodiment of the optical angle detection apparatus according to the present invention.

FIG. 6 is a schematic block diagram showing another embodiment of the optical angle detection apparatus according to the present invention. In the embodiment shown in FIGS. 3 and 4, the optical axis orientation is switched by rotating the distance measurement unit. On the contrary, this embodiment shown in FIG. 6 switches the optical axis orientations using a mirror while fixing the distance measurement unit. This method makes it possible to more accurately switch the optical axis orientations. As shown, the optical axis deflector 6 includes a rotatably mounted mirror 61. This mirror 61 is disposed on the path of a beam projected by a fixed light projecting portion 2 and the path of a beam to be received by a fixed light receiving portion 3. The optical axis is deflected to the first orientation and to the second orientation by rotating the mirror 61 under control of a microcomputer 7 that constitutes a controller. The optical angle detection apparatus having such a configuration will now be described in detail with reference to FIG. 6.

The optical distance measurement unit includes the light projecting portion 2 and the light receiving portion 3, which are connected to the microcomputer 7 via a distance measurement portion 4. On the other hand, the optical axis deflector 6 includes the mirror 61, a gear mechanism 63, a motor 65, and a driver 66. The driver 66 rotates the motor 65 clockwise and counterclockwise under the control of the microcomputer 7. The torque of the motor 65 is transferred to the mirror 61 via the gear mechanism 63, thereby switching the optical axis orientation of the distance measurement unit to the left and to the right. A pair of photo-interrupters PI1 and PI2 connected to the microcomputer 7 are used to control the switching of the mirror 6.

Figure 7:
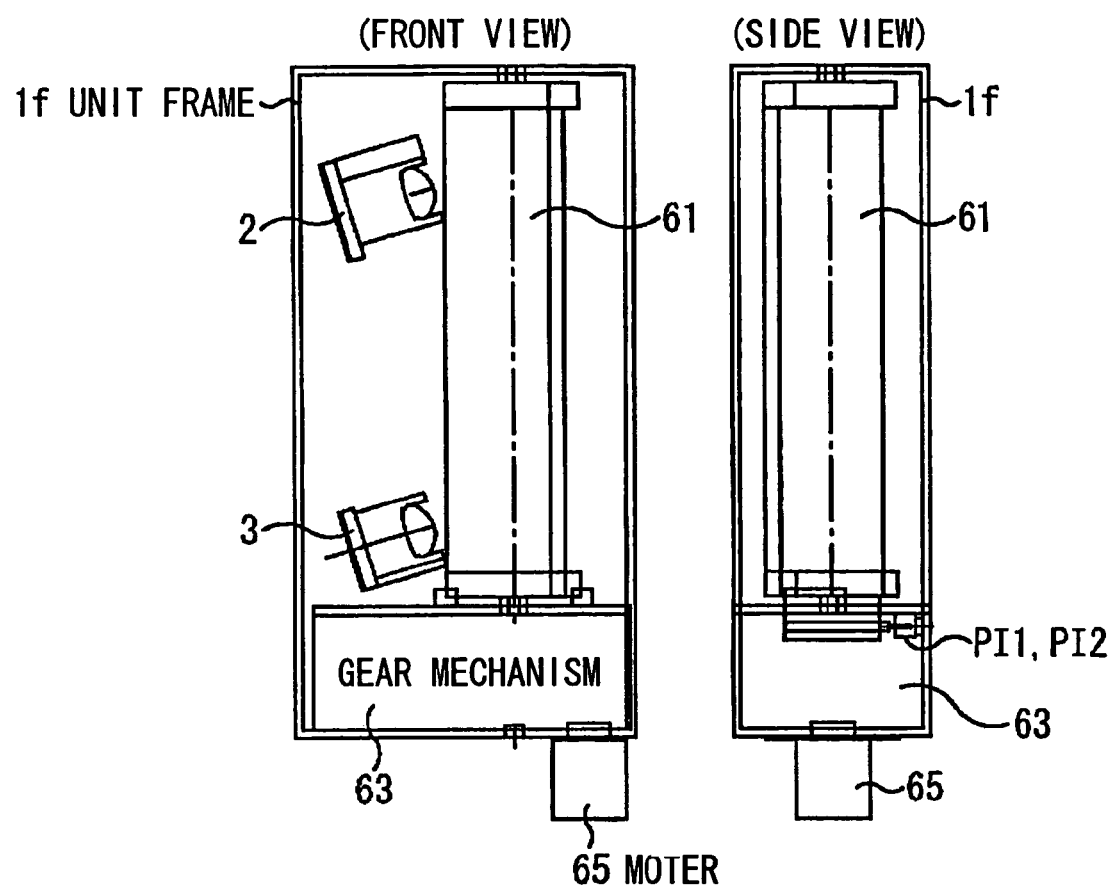
FIG. 7 are front and side views showing a detailed example of the configuration of the embodiment shown in FIG. 6.

FIG. 7 are front and side views showing a detailed example of the configuration of the optical distance measurement unit and the optical axis deflector shown in FIG. 6. As shown, an optical distance measurement unit, which includes a pair of a light projecting portion 2 and a light receiving portion 3, is housed in a cuboid-shaped unit frame 1f that is formed of a resin molding. An optical axis deflector is assembled using the unit frame 1f. Specifically, a mirror 61 is disposed along the longitudinal direction of the unit frame 1f and is rotatably assembled in the unit frame 1f. A motor 65 and a gear mechanism 63 are also assembled in the unit frame if. Photo-interrupters PI1 and PI2, which detect the position of the mirror 61, are also assembled in the unit frame 1f. The light projecting portion 2 and the light receiving portion 3 are assembled therein in such a manner that their optical axes are inclined with respect to a reflection surface of the mirror 61. This is in order to give a specific angle of elevation to optical axis orientations that are switched by the mirror 61.

Figure 8:
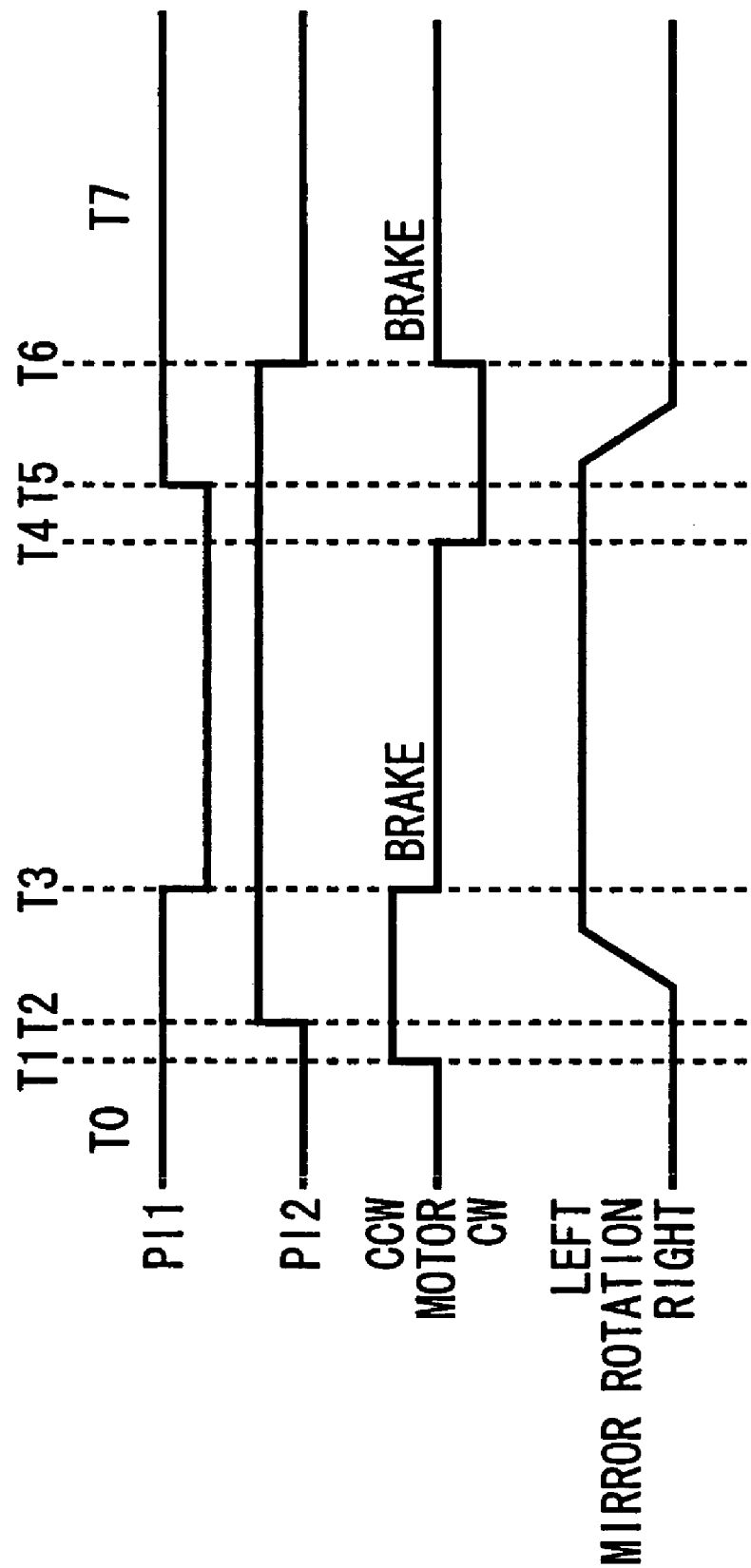
FIG. 8 is a timing chart illustrating how the embodiment shown in FIG. 6 operates.

FIG. 8 is a timing chart showing the switching sequence of the mirror 61. This timing chart shows changes in the output level of a pair of the photo-interrupters PI1 and PI2, the rotational state (CW or CCW) of the motor, and the rotational position (left or right) of the mirror along the time axis. "CW" denotes the clockwise rotation of the motor and "CCW" denotes the counterclockwise rotation of the motor. The components are in initial setting state at time T0. At this time, normally, the mirror is at a right rotational position and the photo-interrupter PI1 is at high level whereas the photo-interrupter PI2 is at low level.

At time T1, the motor starts and rotates counterclockwise "CCW". Accordingly, the mirror starts rotating to the left, and, at time T2, the output of the photo-interrupter PI2 is switched from low level to high level. When the mirror further rotates to the left and then contacts a stopper, the output of the photo-interrupter PI1 is switched to low level. In response to this, a brake is applied to the motor. In this manner, the output of PI1 drops to low level and the output of PI2 rises to high level when the mirror is switched from the right to the left.

Thereafter, at time T4, the brake is released and, thereafter, the motor rotates clockwise "CW". In response to this, at time T5, the output of the photo-interrupter PI1 is switched from low level to high level. As the motor further rotates clockwise, the mirror rotates to the right and then contacts a stopper at time T6. In response to this, a brake is applied to the motor. As a result, at time T7, the mirror returns to the initial setting state. Also, the output of the photo-interrupter PI1 rises to high level and the output of the photo-interrupter PI2 drops to low level, returning to their initial setting states.

Figure 9:
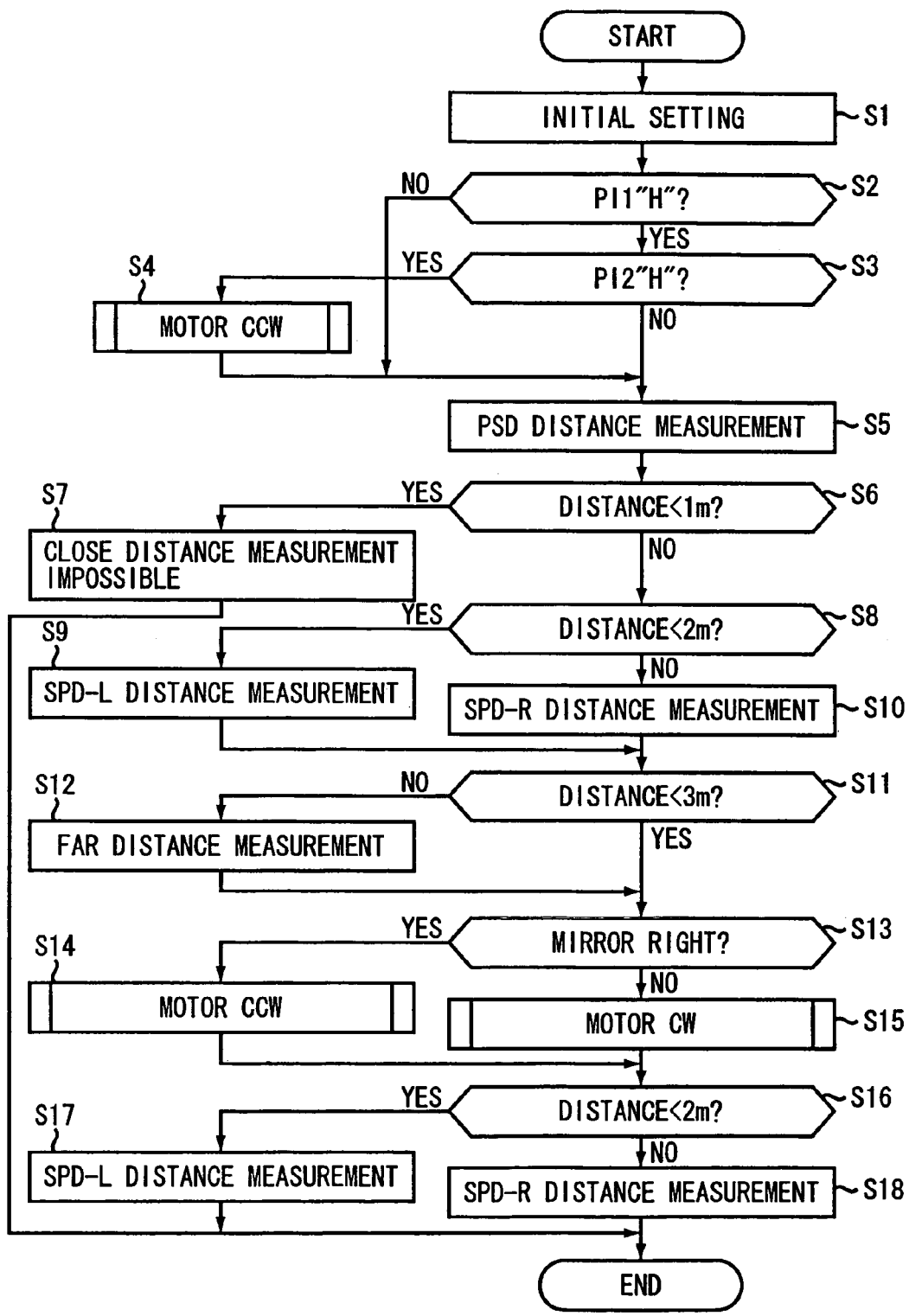
FIGS. 9(1), 9(2) and 9(3) are a flow chart illustrating how the embodiment shown in FIG. 6 operates.
Figure 9:
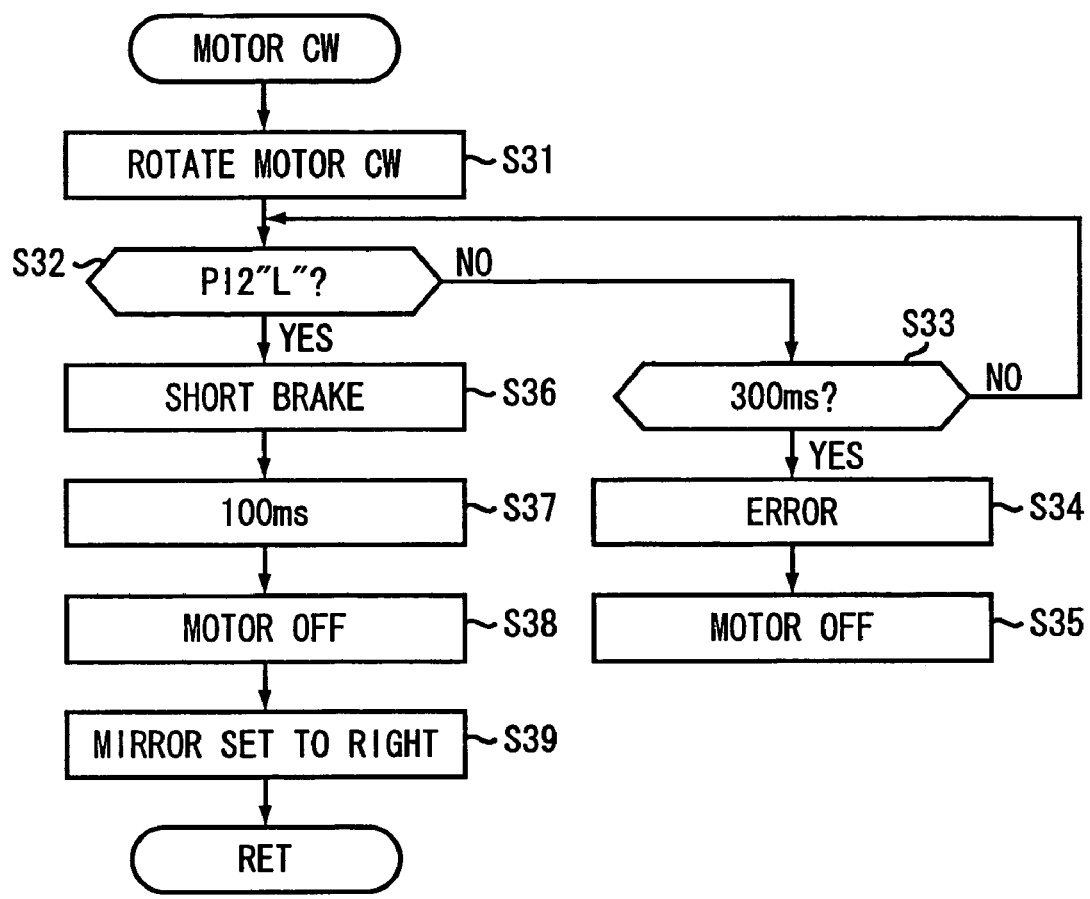

FIGS. 9(1), 9(2) and 9(3) are a flow chart illustrating the operation of the embodiment shown in FIGS. 6 and 7. This embodiment also uses a combination of a PSD and an SPD as a light receiving diode. Two SPDs, SPD-L and SPD-R, are selectively used depending on the distance. As shown in a main routine of FIG. 9(1), first, the mirror is initialized at step S1. Next, at step S2, it is determined whether or not the output of the photo-interrupter PI1 is at high level (H). When the determination is NO (N), the procedure proceeds directly to step S5 to perform distance measurement using the PSD. On the other hand, if the determination at step S2 is YES (Y), the procedure proceeds to the next step S3 to determine whether or not the output of the photo-interrupter PI2 is at high level (H). If the determination is NO (N), the procedure proceeds directly to step S5 to perform distance measurement using the PSD. On the other hand, if the determination is YES (Y), the procedure branches to step S4 to activate a subroutine "Motor CCW" and to set the mirror to the left. As a result, when the determination of step S2 is NO and when the determination of step S3 is YES, the mirror is set to the left. On the other hand, when the determination of step S3 is NO, the mirror is set to the right.

Thereafter, at step S5, distance measurement is performed using the PSD to obtain the distance to one measurement point on an object. The distance measurement of step S5 is preliminary, and thus a PSD having a wide distance measurement range is used. Then, it is determined at step S6 whether or not the measured distance is less than 1 m. If the determination is YES, it is determined at step S7 that the distance measurement is impossible due to close distance and the main routine is terminated after setting a flag indicating the impossibility. On the other hand, when the determination of step S6 is NO, the procedure proceeds to step S8 to determine whether or not the distance measured using the PSD is less than 2 m. If the determination is YES, the main distance measurement is performed using the SPD-L. The SPD-L has a distance measurement range that is adjusted between 1 m to 2 m. If the determination of step S8 is NO, the procedure proceeds to step S10 to perform the main distance measurement using the SPD-R. The distance measurement range of this SPD-R is set from 2 m to 3 m. Thereafter, the procedure proceeds to step S11 to determine whether or not the distance measured using the SPD-R is less than 3 m. If the determination is NO, the distance exceeds 3 m, and thus the procedure proceeds to step S12 to set a flag indicating that the measurement is a far distance and then returns to the main routine. On the other hand, if the determination of step S11 is YES, SPD-R distance measurement has been performed with a proper range, and thus the procedure proceeds to the next step.

At step S13, the output levels of a pair of photo-interrupters PI1 and PI2 are read and it is determined whether or not the mirror is at the right position. If the determination is YES, the procedure proceeds to step S14 to activate the sub routine "Motor CCW" to switch the mirror to the left. On the other hand, if the determination of step S13 is NO, the procedure proceeds to step S15 to activate a sub routine "Motor CW" to set the mirror to the right. After the mirror is switched in this manner, it is again checked at step S16 whether or not the distance is less than 2 m. If the determination is YES, the procedure proceeds to step S17 to perform distance measurement using the SPD-L. On the other hand, if the determination is NO, the procedure proceeds to step S18 to perform distance measurement using the SPD-R. In such a manner, the mirror is switched to the left and to the right and distance measurement is performed using a properly selected SPD in the main routine. The main routine is then terminated.

Flow chart of FIG. 9(2) shows the sub routine "Motor CCW". After the motor starts rotating counterclockwise "CCW" at step S21, it is determined at step S22 whether or not the output of PI1 is at low level (L). If the determination is NO, it is determined at step S23 whether or not 300 ms has passed after the motor starts. If the determination is NO, the procedure returns to step S22 to iterate this loop. At step S23, it is again determined whether or not 300 ms has passed. If the determination is YES, error processing is performed at step S24 and the motor is turned off at step S25.

On the other hand, if the determination of step S22 is YES, the procedure proceeds to step S26 to apply a short brake. After waiting 100 ms at step S27, the motor is turned off at step S28. Accordingly, the mirror is shifted to the left as denoted at step S29, and the procedure returns from the sub routine to the main routine.

Flow chart of FIG. 9(3) shows the sub routine "Motor CW". At step S31, the motor starts rotating clockwise "CW", and it is determined at step S32 whether or not the output of PI1 is at low level (L). Thereafter, at step S39, the mirror is set to the right via steps S36-S38, and the procedure returns from this sub routine to the main routine. A detailed description of the sub routine "Motor CW" is omitted since the basic flow thereof is similar to that of the sub routine "Motor CCW".

Figure 10A:
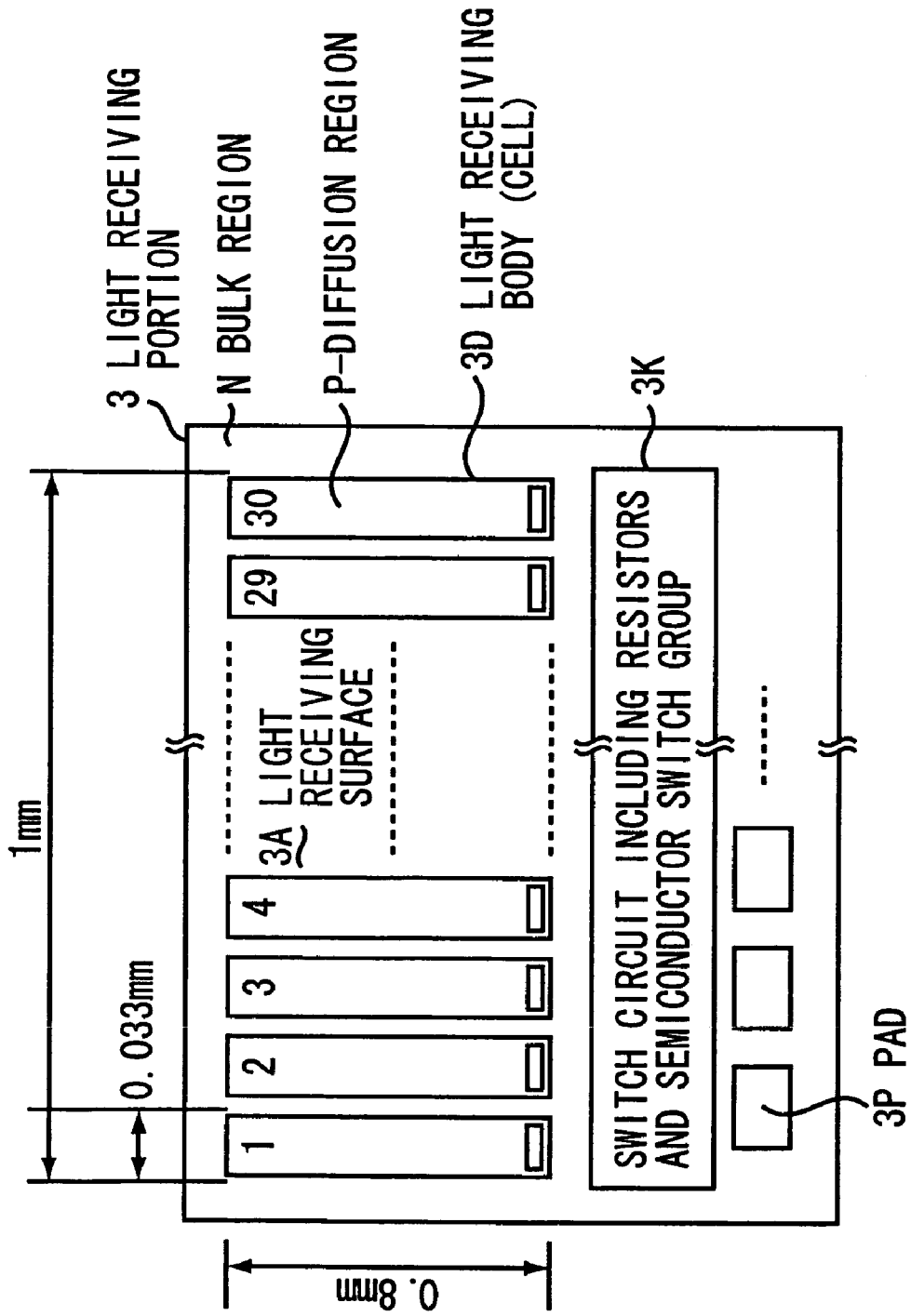
FIGS. 10(A) and 10(B) are schematic views showing an example configuration of an optical distance measurement unit embedded in the embodiment shown in FIG. 6.
Figure 10B:
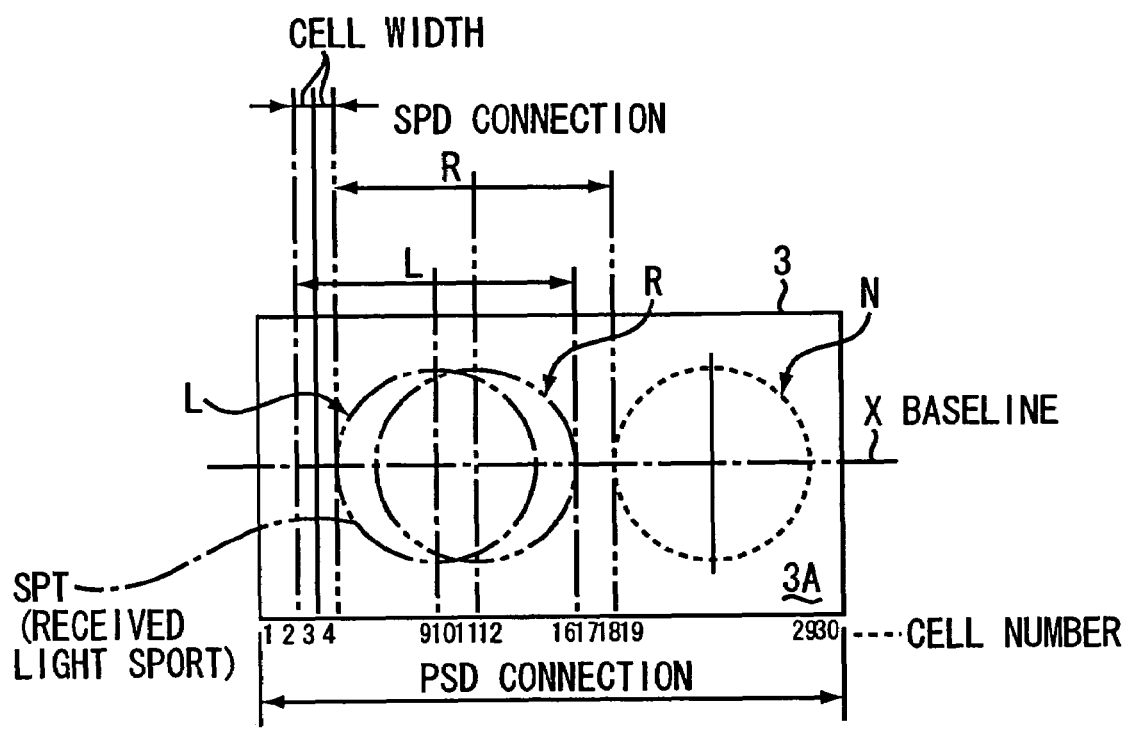

FIGS. 10(A) and 10(B) are schematic views showing a detailed example of the configuration of the light receiving portion shown in FIG. 6. As shown in FIG. 10(A), the light receiving portion 3 includes a light receiving surface 3A that is disposed along the direction of a base line (the horizontal direction of the drawing) perpendicular to the optical axis in order to receive a light spot reflected from the object, and outputs an electrical signal corresponding to the light receiving position of a light spot on the light receiving surface through a pad 3P. A controller is connected to the pads 3P. The controller controls the light receiving portion 3 and processes the electrical signal to obtain the distance to the object. The light receiving portion 3 includes a plurality of light receiving bodies (light receiving cells) 3D and a switch circuit 3K. The plurality of light receiving bodies are arranged in such a manner that the light receiving surface 3A is divided vertically into a plurality of parts arranged along the baseline direction. The switch circuit 3K includes resistors and a group of switches that can switch connection states between the plurality of light receiving bodies 3D. The controller controls the switch group via the pads 3 to divide at least part of the plurality of light receiving bodies 3D, along a specific boundary, into two groups along a specific boundary and to combine light receiving bodies 3D belonging to each of the divided groups, thereby constituting two pseudo light receiving surfaces. The controller also controls the switch group to shift and adjust the boundary on a per light receiving body basis or on the basis of two or more light receiving bodies so as to correspond to the light receiving position of the light spot.

The light receiving portion 3, which is composed of a one-chip IC, includes the light receiving surface 3A, the switch circuit 3K, the pads 3P, and the like as described above. Each of the light receiving bodies (cells) 3D formed on the light receiving surface 3A is obtained by forming a P-diffusion region in an N bulk made of silicon and is referred to as an SPD element. The length of each light receiving body 3D is 0.8 mm and the width thereof is 0.033 mm. A multi-divided light receiving surface 3A is formed by arranging, for example, 30 light receiving bodies 3D of this length and this width along the baseline direction. The total length of the light receiving surface 3A along the baseline direction is 1 mm. However, the shown dimensions are only illustrative and the present invention is not limited to these dimensions.

The light receiving surface 3A of the light receiving portion 3 is divided into 30 light receiving bodies arranged along a baseline X as shown in FIG. 10(B), and the light receiving bodies are denoted by numbers 1 to 30. On the other hand, the received light spot SPT moves in the direction of the baseline X depending on the distance of the object. The light receiving position of the received light spot SPT is indicated by the center thereof. In the shown example, as the distance to the object decreases, the light receiving position of the received light spot SPT moves from the right to the left along the baseline X. In the present invention, it is possible to selectively switch between two connection states, one where the multiple divided cells operate as an equivalent PSD by connecting the cells using resistors and the other where the cells operate as two divided SPDs. Especially, in the two-divided SPD connection, the division boundary is shifted and adjusted so as to correspond to the light receiving position of the light spot SPT.

The multi-divided PSD includes a total of 30 light receiving bodies corresponding to cell numbers 1 to 30 and the total length of the light receiving surface 3A is 1 mm (=0.033 mm×30). A light spot SPT located, for example, at a position N is received through the multi-divided light receiving surface.

On the other hand, light receiving bodies of cell numbers 3 to 16 constitute an SPD-L, which is one of the two divided SPDs. Thereby, it is possible to perform distance measurement of a received light spot L that has returned from an object located, for example, 1 m to 2 m away. An SPD-R, which is the other of the two divided SPDs, is formed of light receiving bodies of cell numbers 5 to 18 by changing the combination of the light receiving bodies. A light spot R, which has returned from an object located 2 m to 3 m away, is received through the SPD-R. The central division line of the SPD-L is located between the cell numbers 9 and 10. The central division line of the SPD-R is located between the cell numbers 11 and 12. The SPD-L and the SPD-R can be properly selected by switching the division line according to the distance measurement range in such a manner.

In this optical angle detection apparatus, the switching of the multi-divided light receiving surface is controlled according to the preliminary distance measurement and the main distance measurement, and the PSD and the SPD are selectively used. The PSD having a wide measurement range is used for the preliminary distance measurement. The SPD, which is more accurate than the PSD, is used for the main distance measurement. However, two SPDs, an SPD-L and an SPD-R, are selectively used since the SPD has a relatively narrow measurement range. Highly accurate angle detection can be performed in this manner.

Figure 11:
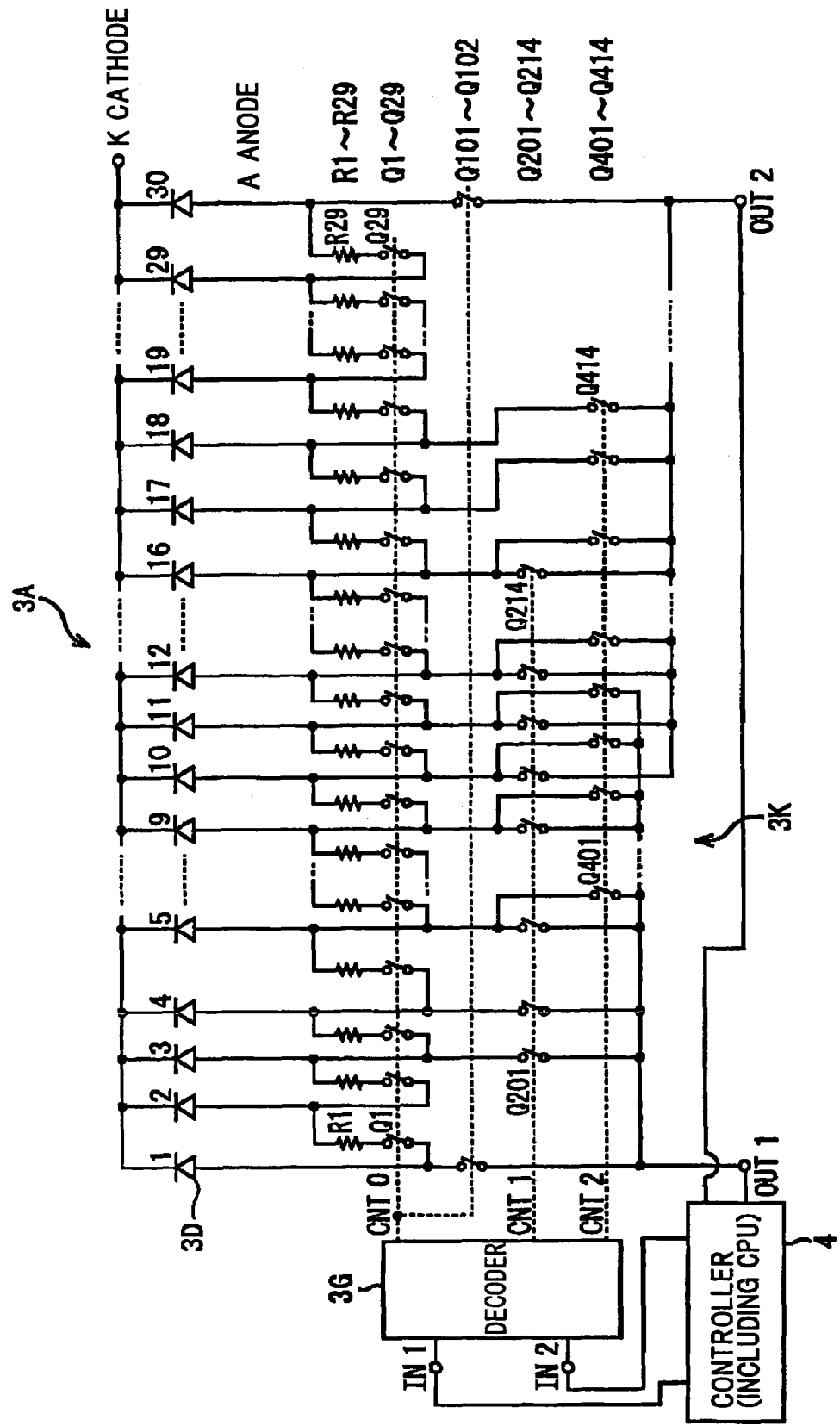
FIG. 11 is a circuit diagram of the optical distance measurement unit shown in FIGS. 10(A) and 10(B)

FIG. 11 is a circuit diagram showing a detailed configuration of the light receiving portion shown in FIG. 10(A)s shown, the light receiving portion includes a light receiving surface 3A and a switch circuit 3K. 30 light receiving bodies 3D are formed on the light receiving surface 3A. Each of the light receiving bodies 3D includes a silicon photo diode, and their cathodes K are commonly connected and their anodes A are connected to a switch circuit 3K. The switch circuit 3K includes switching elements QN including resistors R1 to R29, MOS transistors, or the like. The resistors R1 to R29 are, for example, 10KΩ. The switch circuit 3K is connected to a controller 4, which includes a CPU, via output terminals OUT1 and OUT2. The switch circuit 3K is also connected to input terminals IN1 and IN2 of the controller 4 via a decoder 3G. The decoder 3G decodes a bit signal received via the input terminals IN1 and IN2 from the controller 4 and provides control signals CNT0 to CNT2 to the switch circuit 3K. In the case of the multi-divided PSD connection, the control signal CNT0 is activated and switching elements Q1 to Q29 and switching elements Q101 and Q102 are turned on. This allows the 30 light receiving bodies 3D to be connected via the resistors R1 to R29 and thus to operate as an equivalent PSD. On the other hand, in the case of the two-divided SPD connection, the control signal CNT0 is deactivated and either the control signal CNT1 or CNT2 is selectively activated and a corresponding one of a group of switching elements Q201 to Q214 and a group of switching elements Q401 to Q414 is turned on. In this two-divided SPD operation, a pseudo two-divided SPD receiving surface is formed by dividing light receiving bodies into two groups and directly connecting light receiving bodies belonging to each of the two groups. That is, when the control signal CNT1 is activated, the SPD-L is selected, and when the control signal CNT2 is activated, the SPD-R is selected.

Figure 12:
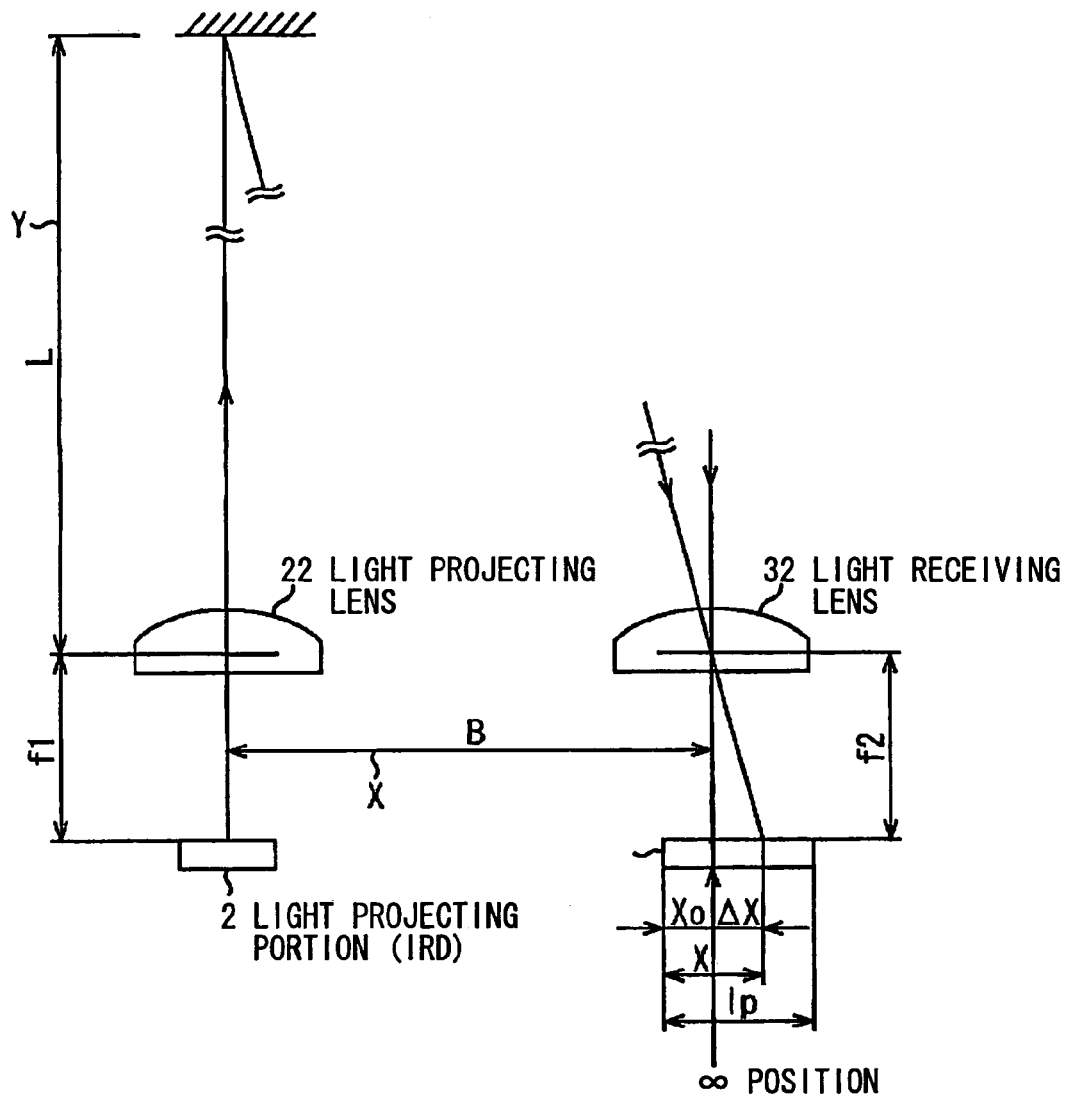
FIG. 12 is a geometrical optics diagram showing the optical structure of the optical distance measurement unit shown in FIGS. 10(A) and 10(B)

FIG. 12 is a schematic view showing the overall optical structure of the optical distance measurement unit according to the present invention. For the sake of convenience, contrary to FIG. 10, the light receiving position of the received light spot is shown as if it moves from the left to the right along the baseline X as the distance to the object decreases. As shown, this distance measurement unit includes a light receiving portion 3 and a light projecting portion 2. The light projecting portion 2 includes, for example, an IRD and projects a light spot onto the object in the direction of an optical axis Y. A light projecting lens is used for this projection. In order to receive a light spot reflected from the object, the light receiving portion 3 forms a light receiving surface disposed along the direction of a baseline X perpendicular to the optical axis Y and outputs an electrical signal according to the light receiving position of the optical spot on the light receiving surface. The light spot reflected from the object is imaged on the light receiving surface through a light receiving lens 32. In FIG. 12, "B" denotes the length of the baseline, "f1" denotes the focal length of the light projecting lens 22, "f2" denotes the focal length of the light receiving lens 32, "lp" denotes the total length of the light receiving surface, "L" denotes the distance to the object, "x" denotes the light receiving position of the light spot from the left end of the light receiving surface, "x0" denotes the light receiving position when the distance L to the object is infinite, and "Δx" denotes the difference between x and x0. Here, Δx=B·f2/L according to the known triangulation principle. The light receiving position Δx of the actual optical spot, relative to the light receiving position x0 corresponding to the infinite distance to the object, is inversely proportional to the distance L to the object. In other words, the distance L to the object can be obtained by detecting Δx through the light receiving portion 3. In the optical setting example shown in FIG. 12, the baseline length B is 25 mm, and the focal length f2 of the light receiving lens is 10 mm.

Figure 13:
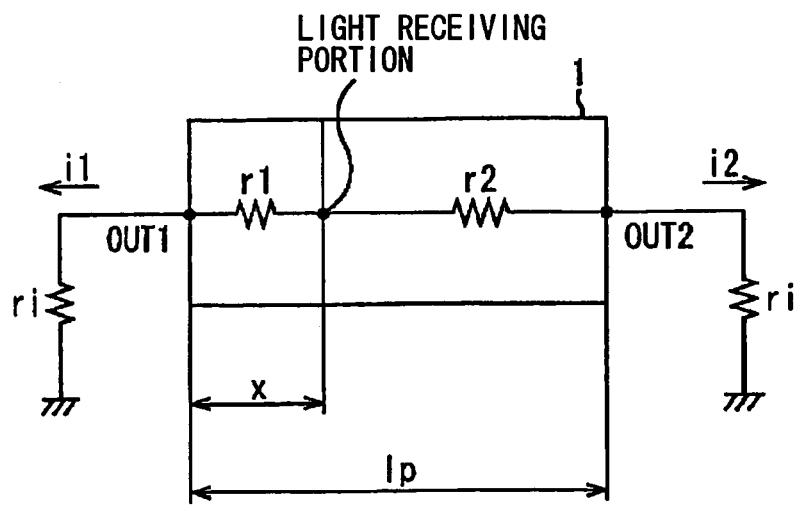
FIG. 13 is a circuit diagram illustrating how the optical distance measurement unit operates.

FIG. 13 is an equivalent circuit diagram illustrating how the present distance measurement unit operates with the PSD connection. Here, "lp" denotes the total length of the light receiving surface of the light receiving portion 3 and "x" denotes the light receiving position from the left end of the light receiving surface as described above. "R" is a PSD resistance which is expressed by "R=r1+r2". Here, "r1" denotes a resistance formed between the light receiving position and an output terminal OUT1 and "r2" denotes a resistance formed between the light receiving position and an output terminal OUT2. "ri" denotes an input impedance of an amplifier connected to the output terminals and "i0" denotes a photoelectric current in the light receiving portion 3, where i0=i1+i2. Here, "i1" denotes a current output from the output terminal OUT1 and "i2" denotes a current output from the output terminal OUT2. In this case, a distance measurement output AFO is output as the ratio of currents i1 and i2 as expressed by Expression 1. In the example of Expression 1, the output currents are set such that the distance measurement output increases as x increases.

$$AFO \propto \frac{i2}{i1+i2} \quad \text{[Expression 1]}$$

If it is assumed that the currents i1 and i2 are inversely proportional to the light receiving position and the input impedance ri and the resistance r1 is proportional to the light receiving position x, Expression 2 is obtained.

$$AFO \propto \frac{i2}{i1+i2} = \frac{\frac{ri}{R}}{\frac{2ri}{R}+1} + \frac{1}{\left(\frac{2ri}{R}+1\right)lp}x \quad \text{[Expression 2]}$$

Here, if it is assumed that R is far higher than ri, Expression 3 is obtained, so that the distance measurement output AFO has a gradient of 1/lp.

$$AFO \propto \frac{x}{lp} \quad \text{[Expression 3]}$$

Here, the relationships with the optical system are given by Expressions 4 and 5.

$$x = xo + \Delta x \quad \text{[Expression 4]}$$

$$\Delta x = \frac{B \cdot f2}{L} \quad \text{[Expression 5]}$$

Here, as described above, "x0" denotes the light receiving position corresponding to the infinite distance, "Δx" denotes the distance of the light receiving position x from x0, "B"

denotes the length of the baseline, "f2" denotes the focal length of the light receiving lens, and "L" denotes the distance to the object.

Here, Expression 6 is obtained by substituting Expressions 4 and 5 into Expression 3.

$$AFO \propto \frac{xo}{lp} + \frac{B \cdot f2}{lp} \cdot \frac{1}{L}$$ [Expression 6]

As is clear from Expression 6, the distance measurement output AFO has a setting point of x0 and is proportional to 1/L with a gradient of B·f2/lp. In addition, in Expression 6, the light receiving position x indicates the center of the received light spot. In the actual distance measurement, it is required that the received light spot be placed on the light receiving surface, and thus the obtained value of x is located inside the light receiving surface, at least the radius of the received light spot away from both ends of the light receiving surface.

Figure 14:
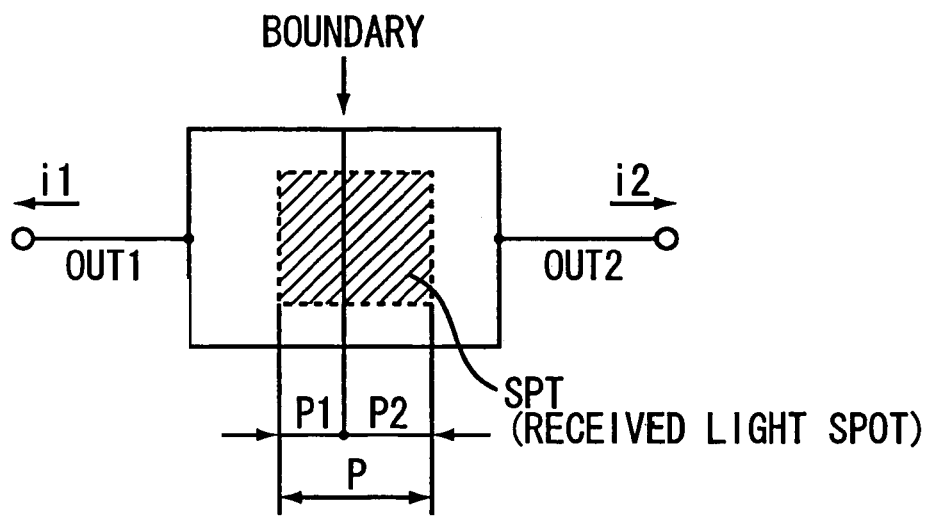
FIG. 14 is a schematic diagram illustrating how the optical distance measurement unit operates.

FIG. 14 is a schematic view illustrating how the present optical distance measurement unit operates with a two-divided SPD. Here, it is assumed that the received light spot SPT is rectangular and has a uniform optical intensity distribution. "P" denotes the width of the spot. "p1" denotes the width of a part of the spot to the left of the central boundary of the two-divided SPD, and "p2" denotes the width of a part of the spot to the right thereof. Thus, P=p1+p2. From one part of the two-divided SPD formed on the light receiving portion 3, a photoelectric current i1 according to the received light intensity is output through an output terminal OUT1. From the other part of the two-divided SPD, a photoelectric current i2 according to the received light intensity is output through an output terminal OUT2 in the same manner. Although the profile of the received light spot SPT is mostly circular, it is assumed to be rectangular for the sake of convenience. This is because the linear part of the output characteristics of the circular profile can very closely approximate that of the output characteristics of the rectangular profile when the range of the light receiving position has been set to a relatively narrow range near the SPD division boundary in the case of the two-divided SPD connection. Here, the diameter of the circular profile is larger than the width P of the corresponding rectangular profile.

Thus, the distance measurement output AFO in the case of the two-divided SPD connection is given by Expression 7.

$$AFO \propto \frac{i2}{i1+i2} = \frac{P2}{P}$$ [Expression 7]

As is clear from Expression 7, the distance measurement output AFO varies with the received light spot position x with a gradient of 1/P.

Figure 15:
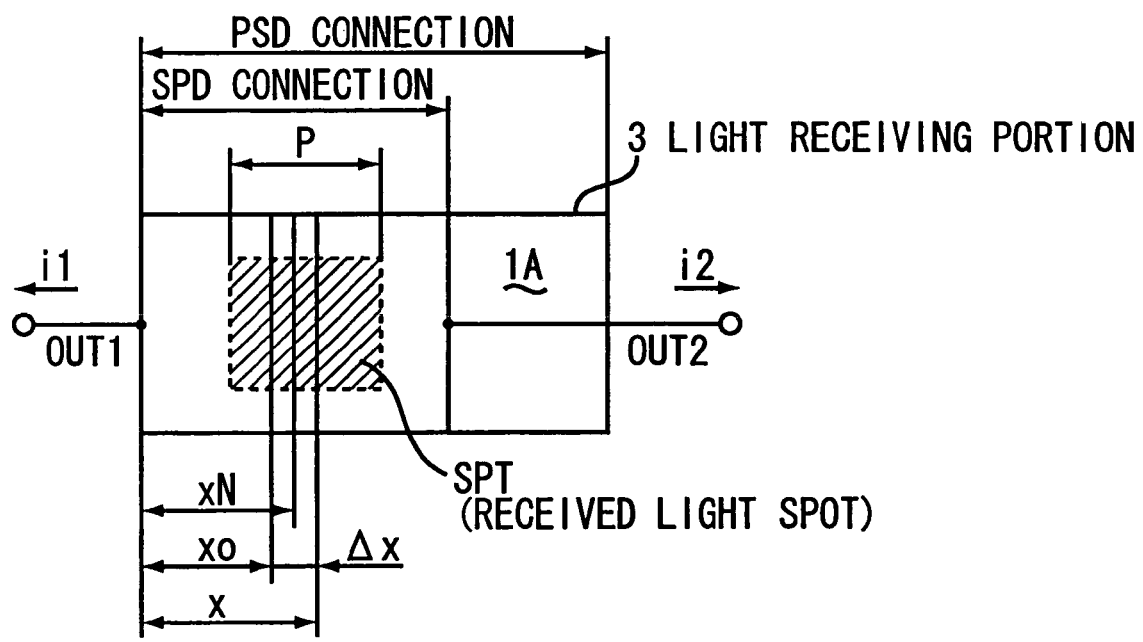
FIG. 15 is a schematic diagram illustrating how the optical distance measurement unit operates.
Figure 16:
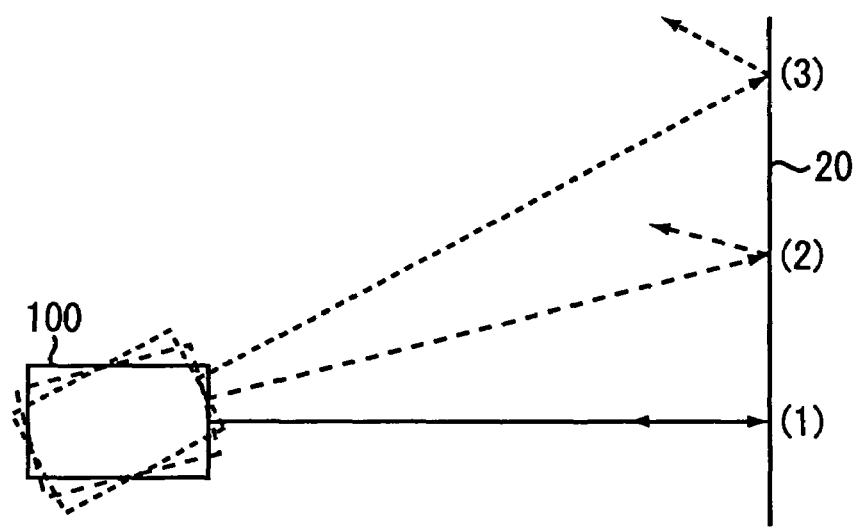
FIG. 16 is a schematic diagram showing an example of a conventional angle detection apparatus.
Figure 17:
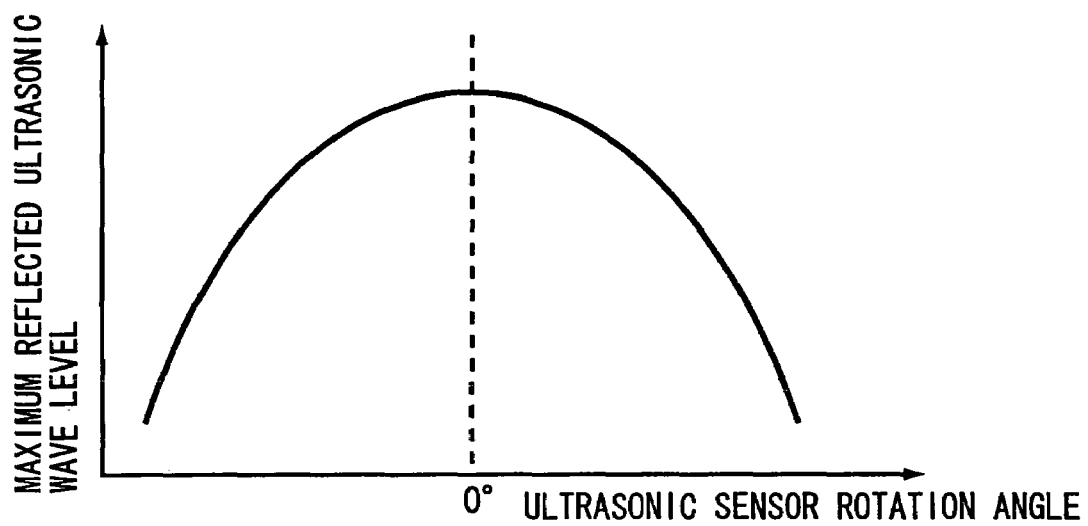
FIG. 17 is a graph illustrating how the angle detection apparatus shown in FIG. 16 operates.
Figure 18:
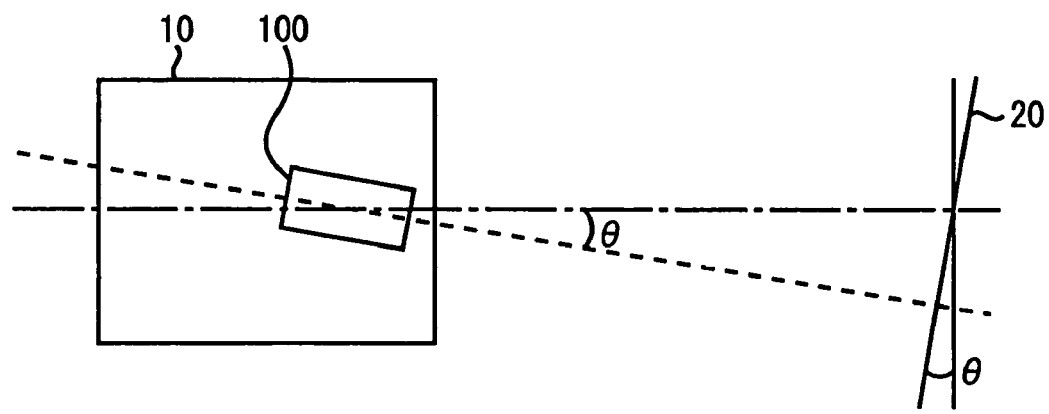
FIG. 18 is a schematic diagram illustrating how the angle detection apparatus shown in FIG. 16 operates.
Figure 19:
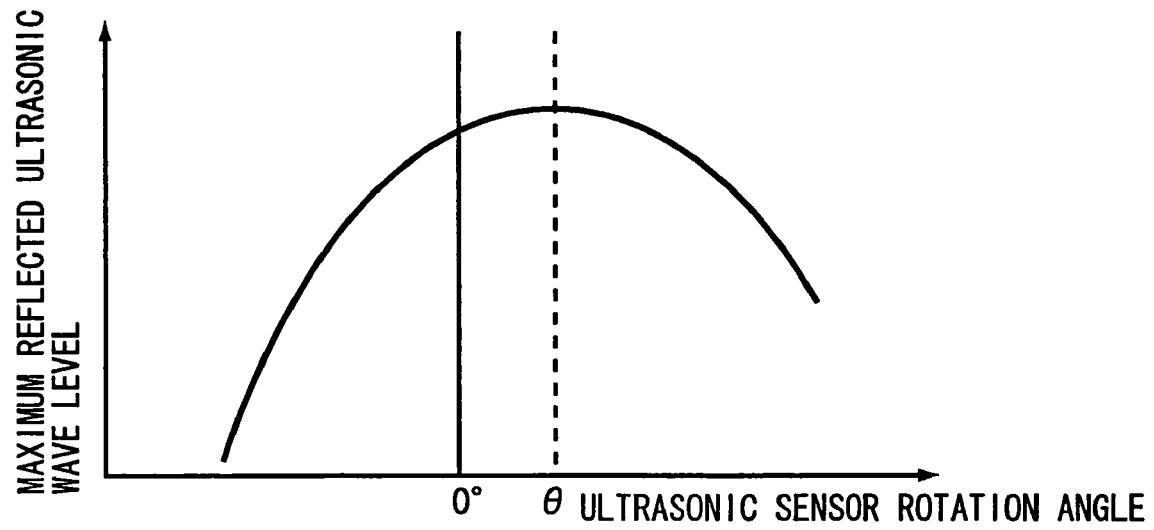
FIG. 19 is a graph illustrating how the angle detection apparatus shown in FIG. 16 operates.

FIG. 15 illustrates a positional relationship when the two-divided SPD shown in FIG. 14 is incorporated into the set optical system of the distance measurement apparatus. In FIG. 15, "xN" denotes the distance from the left end of the light receiving surface of the light receiving portion 3 to the division boundary. The other symbols x0, x, Δx, i1, i2, and P are as defined above. In this case, "i1", "i2", "x", and "Δx" are expressed by Expression 8.

$$i1 \propto \frac{P}{2} - (x - xN)$$ [Expression 8]

-continued $$i2 \propto \frac{P}{2} + (x - xN)$$

$$x = x0 + \Delta x, \Delta x = \frac{B \cdot f2}{L}$$

Expression 9 is obtained by substituting 8 into Expression 7.

$$AFO \propto \frac{i2}{i1+i2} = \frac{\frac{P}{2} + (x-xN)}{P}$$ [Expression 9]

$$= \frac{1}{2} + \frac{x0 - xN + \Delta x}{P}$$

$$= \frac{1}{2} - \frac{xN - x0}{P} + \frac{\Delta x}{P}$$

$$= \frac{1}{2} - \frac{xN - x0}{P} + \frac{B \cdot f2}{lp} \cdot \frac{1}{L}$$

As is clear from Expression 9, in the case of the two-divided SPD connection, the distance measurement output AFO has setting points of xN and x0 and is proportional to 1/L with a gradient of B·f2/P.

What is claimed is:

1. An optical angle detection apparatus comprising:
a single optical distance measurement unit disposed opposite an object having a plane;
an optical axis deflector that can deflect an optical axis, which is oriented from the optical distance measurement unit to the plane of the object, toward a first orientation and toward a second orientation; and
a controller that controls the optical distance measurement unit and the optical axis deflector to measure a tilt angle of the plane of the object,
wherein the optical distance measurement unit includes:
a light projecting portion that projects a beam in the direction of the optical axis; and
a light receiving portion that receives a beam reflected from a measurement position at which the optical axis intersects the plane and outputs a distance measurement signal indicating a distance to the measurement position,
wherein the optical axis deflector includes:
a mounting substrate that mounts thereon the light projecting portion and the light receiving portion which are spaced vertically from each other, and
a rotating substrate that supports the mounting substrate and that is rotatable horizontally for deflecting the optical axis, and
wherein the optical axis deflector deflects the optical axis between the first orientation and the second orientation, thereby switching the measurement position between a first measurement position and a second measurement position, so that a first distance measurement signal corresponding to the first measurement position and a second distance measurement signal corresponding to the second measurement position are output from the optical distance measurement unit,
wherein the controller obtains respective distances to the first and second measurement positions based on the first and second distance measurement signals and calculates the tilt angle of the plane based on the obtained distances.

2. The optical angle detection apparatus according to claim 1, wherein the light receiving portion includes a light receiving surface that is disposed along the direction of a base line perpendicular to the optical axis in order to receive a spot of the beam reflected from the object, and outputs the distance measurement signal corresponding to a position of the received spot on the light receiving surface.

3. The optical angle detection apparatus according to claim 1, wherein the optical distance measurement unit is mounted in a projector and the controller measures a tilt angle of a plane of a screen onto which the projector projects an image, the screen corresponding to the object.

4. The optical angle detection apparatus according to claim 1, wherein the optical distance measurement unit includes only a single light source.

* * * * *